Patented Oct. 28, 1930

1,779,808

UNITED STATES PATENT OFFICE

WILLIS A. GIBBONS, OF LITTLE NECK, NEW YORK, ASSIGNOR TO GENERAL RUBBER COMPANY, OF NEW YORK, N. Y., A CORPORATION OF NEW JERSEY

ADHESIVE COMPOSITION

No Drawing. Application filed March 6, 1925. Serial No. 13,663.

This invention relates to a method of cementing leather surfaces together.

It has been proposed to employ the latex of Hevea Brasiliensis and of other trees which produce similar latices, as cements for leather, cloth, and other materials. It has further been proposed to use such latex or latices which have been compounded, that is to say, which have mixed therewith other ingredients. Preservative agents have been included in such latex adhesives to render them more stable. Methods have also been devised for preparing artificial latices or dispersions of rubber in water. But these artificial latices do not possess the same adhesive proper ties as the natural latices, particularly in regard to leather, for they do not penetrate the leather.

The present invention has for its object an improved process for bonding the surfaces of materials together. Still another object of the invention is to unite leather articles with a leather cement containing an aqueous dispersion of rubber and at the same time utilize material which shall have the property of facilitating penetration of the cement into the leather.

With a particular embodiment in mind, but without intention to limit the scope of the invention beyond what may be required by the prior art, the invention consists in treating leather surfaces with a cement composed, at least in part, of an aqueous dispersion of rubber, treating the surfaces also with a material adapted to increase the penetration of the rubber dispersion into the surfaces to be joined, and in joining said treated surfaces. More specifically, the invention consists in treating leather surfaces with an aqueous dispersion of rubber, treating the surfaces also with a base adapted to increase the penetration of the rubber dispersion into the surfaces to be joined, and in joining said treated surfaces.

As a specific example of the preferred method of applying the invention, an aqueous dispersion of rubber is prepared by any suitable means, and to this dispersion is added a quantity of a base such as ammonia. The base may be added as an aqueous solution, or the dispersion may be caused to absorb a sufficient quantity of gaseous ammonia. The amount of base may be varied, but 2%, calculated upon the total volume of the dispersion, will be found to give satisfactory results. Other bases may be employed, such as trisodium phosphate, or the caustic alkalies, or other alkaline materials which have the property of increasing the penetration of the rubber dispersion into the surfaces to be joined. The leather surfaces are then coated with this mixture of cement and base, and joined. When the cement has become dry, the two surfaces will be found tightly joined. If no base has been added with the cement, the two coated surfaces do not adhere well, but can be separated with comparative ease, and frequently the separation is such that a separate and distinct film of rubber can be stripped from the surfaces. This indicates that the dispersion has not penetrated the leather surfaces, but has remained entirely upon the surfaces. When a base, such as ammonia is in contact with the surfaces at the same time as the dispersion, the latter penetrates the leather and gives a high degree of adhesion between the surfaces.

This increased adhesion may be due to the swelling action of bases on the leather, rendering the leather more absorbent. Other bases may be employed, and the same principle may be applied to other materials than leather, where such materials show an increase in absorbing power when treated with swelling agents of the nature described.

Examples of the cement are as follows, although other proportions and other ingredients than those given may be used. Vulcanizing agents and combinations may also be incorporated.

*Example #1*

30 parts by weight of rubber,
10 parts by weight of silurian shale,
58 parts by weight of water.

*Example #2*

20 parts by weight of rubber,
8 parts by weight of silurian shale,
70 parts by weight of water.

Two parts by weight of a base such as ammonia or trisodium phosphate when applied to surfaces such as leather at the same time as either of the above cements will render the surfaces more receptive of the cement.

The invention does not contemplate the use of ammonia with natural rubber latex, in a way that would allow the ammonia to perform its well-known function of preserving the latex against coagulation. Nor are the appended claims to be construed as reciting the addition of ammonia to natural latex under conditions in which the ammonia could act as a preservative. However, the addition of ammonia to natural latex which already contains a full and sufficient quantity of a preservative other than ammonia and where the ammonia has neither opportunity nor need to act as a preservative does lie within the scope of the present invention.

Having thus described my invention, what I claim and desire to protect by Letters Patent is:

1. A process for bonding the surfaces of materials together which comprises treating said surfaces with artificial aqueous dispersions of rubber and with a material adapted to facilitate the penetration of said rubber dispersion into said surfaces, and joining said surfaces.

2. A process for cementing leather surfaces together which comprises treating said surfaces with artificial aqueous dispersions of rubber and with a base adapted to facilitate the penetration of said dispersion into said surfaces, and joining said surfaces.

3. A process for cementing leather surfaces together which comprises treating said surfaces with artificial aqueous dispersions of rubber and with an agent adapted to swell the surfaces and render them more absorptive, and joining the surfaces.

4. A process for cementing leather surfaces together which comprises simultaneously treating said surfaces with artificial aqueous dispersions of rubber and with ammonia, and joining said treated surfaces.

Signed at New York, county and State of New York, this 28th day of February, 1925.

WILLIS A. GIBBONS.